US011301302B2

(12) United States Patent
McSweeney et al.

(10) Patent No.: US 11,301,302 B2
(45) Date of Patent: Apr. 12, 2022

(54) TECHNIQUES FOR CONVERTING JOBS INTO SCRIPTS

(71) Applicant: EMC IP Holding Company LLC, Hopkinton, MA (US)

(72) Inventors: Paul J. McSweeney, Silversprings (IE); Fearghal O'Maolcatha, Mldleton (IE); Aaron T. Twohig, Rathpeacon (IE); Helen Walsh, Douglas (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 89 days.

(21) Appl. No.: 16/800,258

(22) Filed: Feb. 25, 2020

(65) Prior Publication Data
US 2021/0263712 A1    Aug. 26, 2021

(51) Int. Cl.
*G06F 9/44* (2018.01)
*G06F 9/50* (2006.01)
*G06F 9/451* (2018.01)
*G06F 8/34* (2018.01)
*G06F 8/36* (2018.01)
*G06F 11/36* (2006.01)
*G06F 8/41* (2018.01)

(52) U.S. Cl.
CPC .............. *G06F 9/5066* (2013.01); *G06F 8/34* (2013.01); *G06F 8/36* (2013.01); *G06F 8/41* (2013.01); *G06F 8/43* (2013.01); *G06F 9/451* (2018.02); *G06F 11/3664* (2013.01)

(58) Field of Classification Search
CPC ..... G06F 8/34; G06F 8/41; G06F 8/43; G06F 9/451; G06F 9/5066; G06F 11/3664
See application file for complete search history.

(56) References Cited

U.S. PATENT DOCUMENTS 5,159,687 A * 10/1992 Richburg ................. G06F 8/36
706/45
6,502,102 B1 * 12/2002 Haswell .............. G06F 11/3664
(Continued)

OTHER PUBLICATIONS

Swagger Codegen, https://swagger.io/tools/swagger-codegen/, API Development Tools, Prior to Feb. 25, 2020.
(Continued)

*Primary Examiner* — Tuan A Vu
(74) *Attorney, Agent, or Firm* — Muirhead and Saturnelli, LLC

(57) ABSTRACT

Techniques for performing management operations may include: creating a job using a graphical user interface (GUI) of an application, wherein the job includes at least one task and the job performs a first management operation including the at least one task; storing first information that describes the job in an application database for the application; and performing first processing that generates a code module for the job, wherein said first processing uses the first information from the application database. The code module may be a script written in a target script language. Multiple providers may converts different types of tasks to scripts. The providers may register prior to performing the first processing. Registering may include each provider declaring each type of task the provider converts to a specified target scripting language. The task types may be organized in a hierarchy of classes or categories.

18 Claims, 13 Drawing Sheets

(56) References Cited

U.S. PATENT DOCUMENTS

| | | | |
|---|---|---|---|
| 7,509,244 B1* | 3/2009 | Shakeri | G06F 9/5066 |
| | | | 703/7 |
| 2009/0024986 A1* | 1/2009 | Meijer | G06F 8/41 |
| | | | 717/137 |
| 2013/0036149 A1* | 2/2013 | Kosuru | G06F 9/5066 |
| | | | 709/201 |
| 2015/0128116 A1* | 5/2015 | Chen | G06F 8/41 |
| | | | 717/154 |
| 2018/0203678 A1* | 7/2018 | Park | G06F 8/43 |

OTHER PUBLICATIONS

Swagger, "OpenAPI Specification," Versioin 3.0.3, https://swagger.io/specification/, Prior to Feb. 25, 2020.

* cited by examiner

```
<object class="com.emc.em.smc.configmgmt.pre91.storagegroup.tasks.CreateStorageGroupTask">
  <void property="description">
    <string>Create Storage Group [SG1]</string>
  </void>
  <void property="disableCompression">
    <boolean>false</boolean>
  </void>                                                          } 302
  <void property="id">
    <long>1571243023665</long>
  </void>                                                          } 304
  <void property="sloName">
    <string>Diamond</string>
  </void>                                                          } 306
  <void property="srpName">
    <string>SRP1</string>
  </void>                                                          } 308
  <void property="storageGroupName">
    <string>SG1</string>
  </void>                                                          } 310
  <void property="DSId">
    <string>000197900049</string>
  </void>                                                          } 312
  <void property="numVolumes">
    <long>1</long>
  </void>                                                          } 314
  <void property="volumeSize">
    <long>10</long>
  </void>                                                          } 316
```

FIG. 5

```
from __future__ import print_function
from builtins import input
import sys
from PyU4V import univmax_conn
```
← 408

```
USERS EDIT THIS PART OF PARAMETERS #####
# This is where the Storage Group Name is set
storage_group_name = 'SG1';                          ← 410a
# This is where the Storage Resource Pool name is set
srp_name = 'SRP1';                                   ← 410b
# This is where the Service Level Objective name is set
slo_name = 'Diamond';                                ← 410c
# This is where the number of volumes is set
number_of_volumes = '1';                             ← 410d
# This is where the volume size is set
volume_size = '10';                                  ← 410e
USERS DO NOT NEED TO READ ANY FURTHER FOR PARAMETERS TO BE MODIFIED #####
```
← 410

```
conn = univmax_conn.U4VConn()
version ='1.0.0'
print("version is", version)
dict_from_u4p_job = {'srp_id': srp_name,
    'sg_id': storage_group_name, # needs to be changed or there is a 'The requested storage group resource exists.' error
    'slo': slo_name,
    'num_vols': number_of_volumes,
    'vol_size': volume_size,
    'cap_unit': 'GB',
    'new_vol_size': '20'}
```
← 420

```
conn.provisioning.create_non_empty_storagegroup(
    dict_from_u4p_job['srp_id'], dict_from_u4p_job['sg_id'],
    dict_from_u4p_job['slo'], None, dict_from_u4p_job['num_vols'],
    dict_from_u4p_job['vol_size'], dict_from_u4p_job['cap_unit'])
```
← 430

TECHNIQUES FOR CONVERTING JOBS INTO SCRIPTS

BACKGROUND

Technical Field

This application generally relates to converting jobs into code modules, such as scripts.

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, an application may executed on the host and the application may issue I/O (input/output) operations, such as data read and write operations, sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. The host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for performing management operations comprising: creating a job using a graphical user interface (GUI) of an application, wherein the job includes at least one task and the job performs a first management operation including the at least one task; storing first information that describes the job in an application database for the application; and performing first processing that generates a code module for the job, wherein said first processing uses the first information from the application database. The first information may include task information describing a first task included in the job, and wherein a plurality of providers may convert a plurality of types of tasks to code modules.

In at least one embodiment, creating the job may include executing a wizard or dialogue to perform the management operation. The code module may be a script written in a target scripting language. The first processing may include determining a first of the plurality of providers that converts the first task to a first script in the target scripting language.

In at least one embodiment, processing may include registering the plurality of providers prior to performing the first processing. Registering the plurality of providers may include each of the plurality of providers declaring one or more types of tasks that said each provider converts to a specified one of a plurality of target scripting languages. The management application may be a data storage system management application and the management operation may be a data storage management operation that modifies data storage configuration information describing a configuration of a data storage system.

In at least one embodiment, processing may include executing the script on a host to perform the first management operation, wherein the script includes a first call to a scripting library of the host, and wherein the scripting library is written in the target scripting language. The first call may transfer control to first code of the scripting library included on the host, and wherein the first code of the scripting library may include a second call to a second library included in the management application. The second call to the second library included in the management application may be made made over a control path. The management application may issue at least one request to the data storage system to modify the data storage configuration information describing the configuration of the data storage system. A hierarchy may include the plurality of types of tasks organized into a plurality of levels. The hierarchy may include a plurality of categories, wherein each of the plurality of categories may include two or more of the plurality of types of tasks that are related.

BRIEF DESCRIPTION OF THE DRAWINGS

Features and advantages of the techniques herein will become more apparent from the following detailed description of exemplary embodiments thereof taken in conjunction with the accompanying drawings in which:

FIG. 5 is an example of a portion of code that may be used to represent a task of a job in an embodiment in accordance with the techniques herein;

FIG. 6 is an example of a script that may be generated in an embodiment in accordance with the techniques herein;

DETAILED DESCRIPTION OF EMBODIMENT(S)

Figure 1:
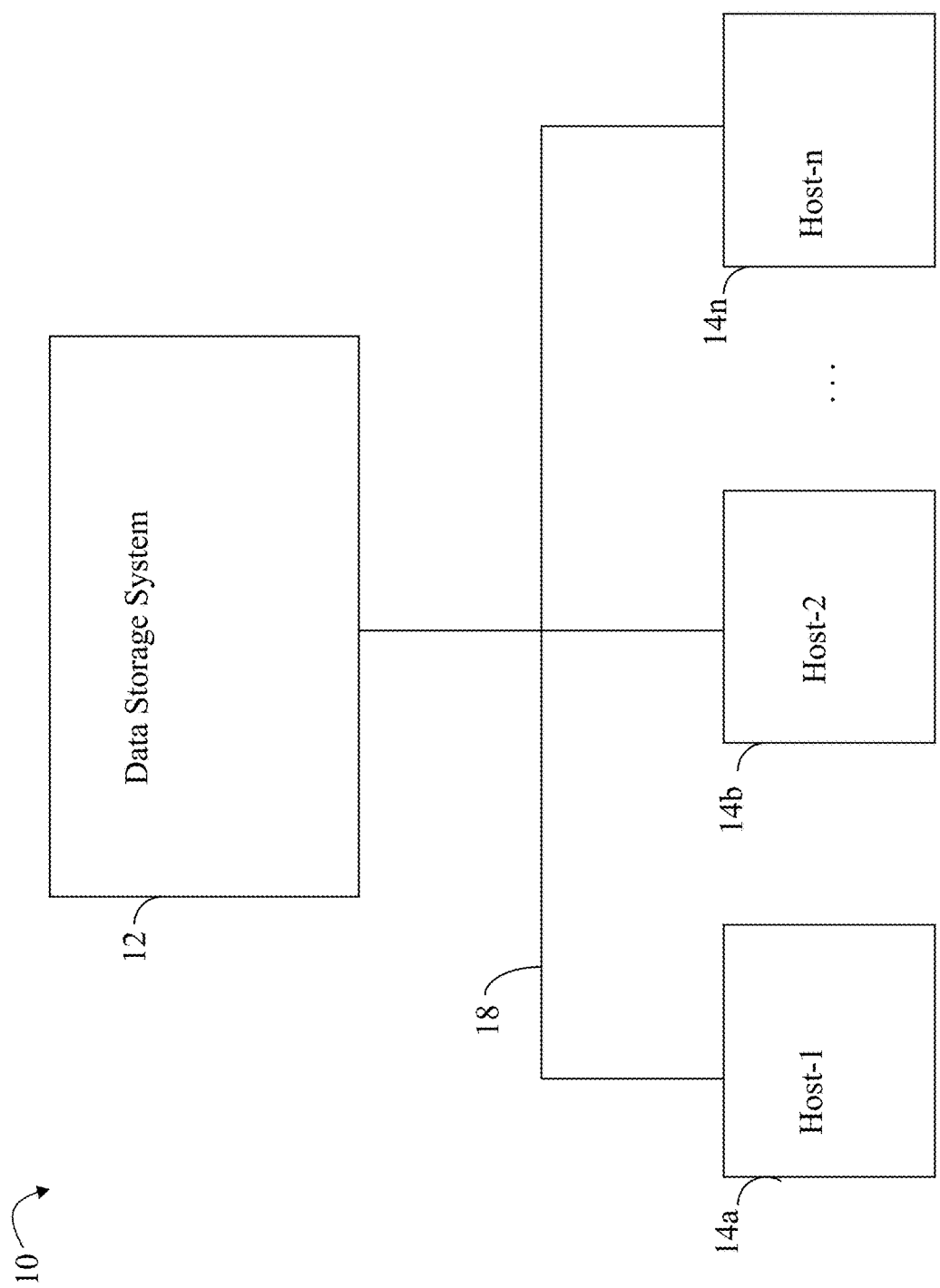
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
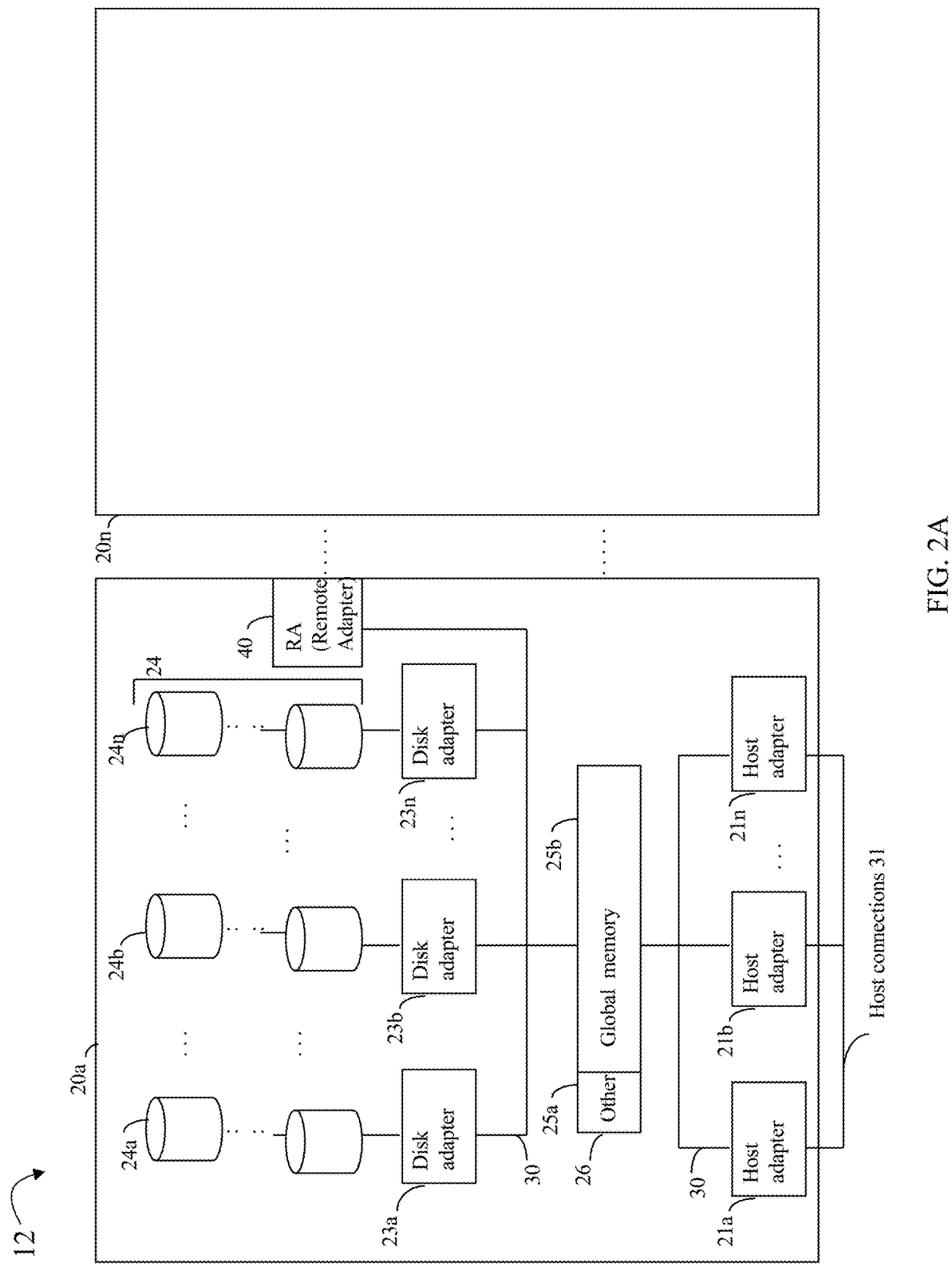
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage such as logical devices which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (e.g., the PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
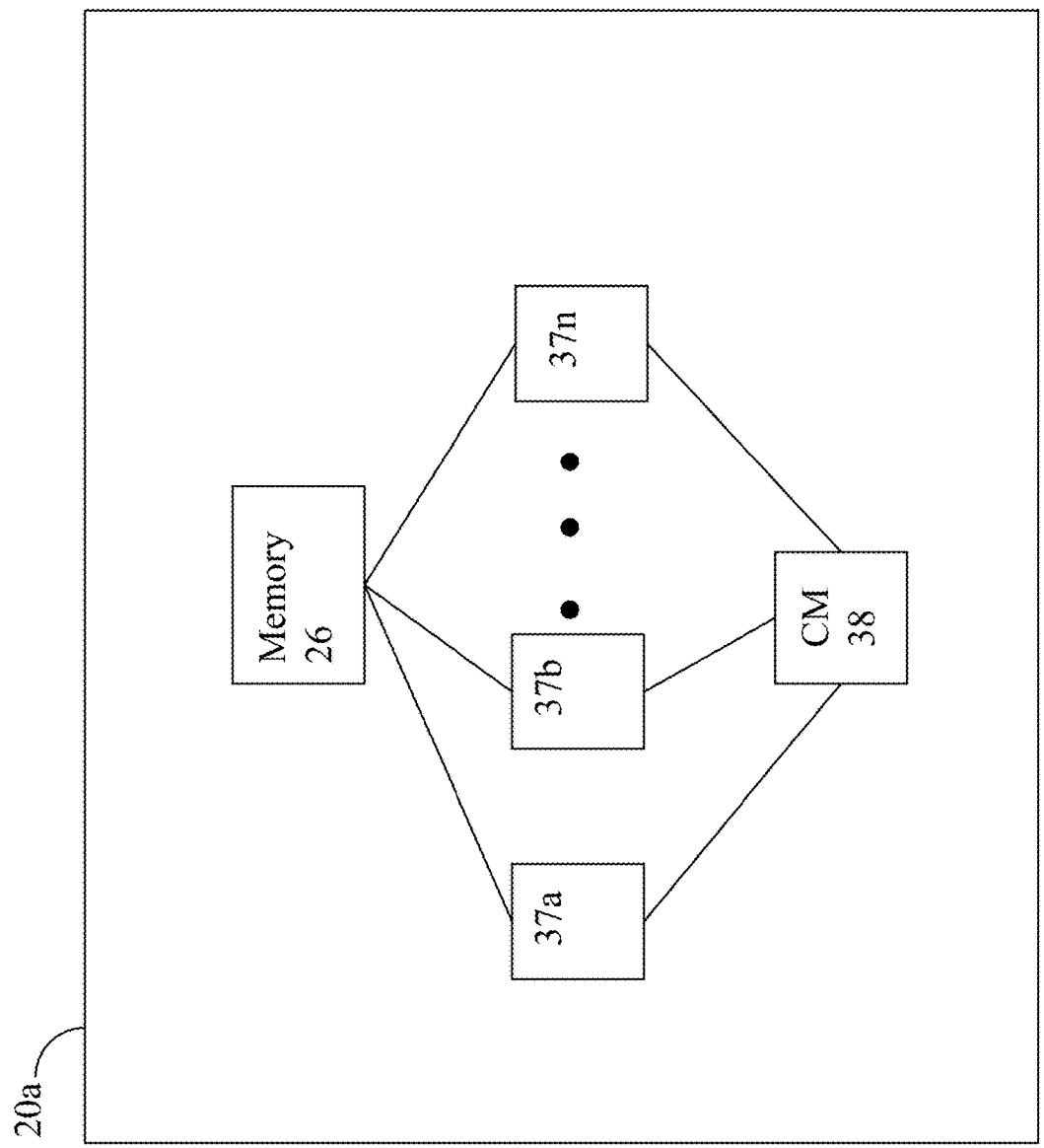
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as the HAs, the DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide one or more data reduction services in efforts to reduce the size of the stored data, for example, stored on the backend non-volatile storage PDs of the data storage system. In at least one embodiment, the data reduction services may include compression.

In at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

In at least one embodiment in accordance with techniques herein, the snapshot facility may be TimeFinder® SnapVX™ by Dell Inc. using the COFW or ROW techniques as noted above. With ROW, when a source volume or logical device is written to and the original data of the source volume or logical device needs to be preserved for a snapshot(s), the new write is accepted and asynchronously written to a new location. The source volume now points to the new data while the snapshot(s) continue to point to the original data (e.g., the snapshot delta) in its original location. For example, U.S. patent application Ser. No. 15/969,048, filed May 2, 2018, "Efficient Snapshot Activation", Chandrashekhara et al, which is incorporated by reference herein in its entirety, describes in more detail processing that may be performed in at least one embodiment in connection with establishing or creating a targetless snapshot as well as a linked snapshot (e.g., linked to a logical device identifier), processing performed in connection with servicing I/O operations directed to the snapshot and source logical device, and other processing.

In at least one embodiment, the replication facilities may include remote data replication facilities such as the Symmetrix Remote Data Facility (SRDF®) products provided by Dell Inc. SRDF® is a family of products that facilitates the data replication from one storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein. For a local copy of a LUN or logical device on a first data storage system, SRDF provides for automatically creating and maintaining a remote physical copy on a remote data storage system. The remote copy may be used, for example, in the case of a site disaster of the first data storage system.

Data storage device communication between data storage systems using the SRDF® product is described, for example, in U.S. Pat. Nos. 5,742,792, 5,544,347, and 7,054,883, all of which are incorporated by reference herein. With the SRDF® product, a user may denote a first storage device, such as R1, as a master storage device and a second storage device, such as R2, as a slave storage device. Other incarnations of the SRDF® product may provide a peer to peer relationship between the local and remote storage devices. For example, the host may interact directly with the device R1 of first local data storage system, but any data changes made are automatically provided to the R2 device of a second remote data storage system using the SRDF® product. In operation, the host may read and write data using the R1 volume in the first data storage system, and the SRDF® product may handle the automatic copying and updating of data from R1 to R2 in second remote data storage system. The SRDF® replication functionality may be facilitated with the RAs provided at each of the foregoing first and second data storage systems. Performing remote data communications using the SRDF® product over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein.

In at least one embodiment in accordance with the techniques herein, the data storage system may include configured storage resources such as storage containers (SCs), used by virtual machines (VMs) that execute in a virtualized environment. The VMs may execute, for example, on the data storage system or on a host connected to the data storage system. The VMs may access and use data stored on logical devices also referred to herein as virtual volumes or VVOLs. For example, an embodiment may have one or more VMs executing on a single physical machine such as host in a virtualized environment using virtualization software, such as vSphere™ from VMware, Inc. In the context of each VM, one or more applications may be executed, where the applications may include any one or more of, for example, an email server application such as Microsoft Exchange Server (IVIES), a web server, or a database server application. The VMs may execute, for example, on one or more hosts. Each VM may access and use data stored on one or more VVOLs having physical storage provisioned on a data storage system.

Data used by a VM that is stored on a VVOL may include data used by the particular application executing on the VM (e.g., database data and log files for a database application executing on a VM such as VM 1 602*a*) as well as VM metadata regarding its state, configuration, and execution context such as, for example, data stored in memory, CPU registers, swap files, log files, and the like. VVOLs may be provisioned from a storage container (SC) by a data storage administrator, such as a virtualization administrator. A SC may build upon, or be configured from, allocated storage of one or more storage pools of PDs. A storage pool may be configured as a logical grouping of one or more PDs. In at least one embodiment, a storage pool may include one or more RAID groups of PDs from which other logical storage entities, such as SCs and LUNs may be configured.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from the data storage management software, such as a data storage system management application, executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In at least one existing system, the data storage system management application may be used to create a job that performs one or more tasks such as to perform a data storage system configuration operation. A user, such as a data storage administrator, may use the GUI of the management application to create a job that can be executed now, or scheduled to run at a later point in time. The GUI may provide an easy way for job creation. However, there may be circumstances where the user would like to, for example, automate job creation and not require use of the GUI. In such cases, the existing system may provide an API (application programming interface) that makes calls into a library of code to perform data storage management operations.

In at least one existing system, the API may be, for example, the Unisphere Management REST API that conforms to Representational State Transfer (REST) design principles, which is a frequent choice for many web-based APIs. As known in the art, in a REST API, each resource type (e.g., object) has a unique Universal Resource Identifier (URI), and each resource instance has a unique identifier. A user interacts with the resources exposed by the API by accessing resources using HTTP GET, POST, and DELETE requests.

Rather than use the GUI to create and execute a job, the user may, for example, write a script or other code module that makes suitable REST API calls to perform the desired data storage management operations. However, manual creation of the scripts including the REST API calls requires the storage administrator or other developer composing the scripts to have knowledge regarding the REST API calls. Also manual script creation can be complex and introduce the possibility for additional human error.

It may be desirable to use the techniques as described herein to automate the conversion of jobs into scripts. In at least one embodiment, a job may include one or more tasks. The job may be created using the GUI of the management application. The job may perform a data storage system management operation. The management application may also include functionality that facilitates converting the job into a script. Execution of the script may result in execution of the appropriate REST API calls that perform the same data storage system management operation as if the job is created and run using the GUI.

In at least one embodiment, the script may or may not directly invoke the REST API. In at least one embodiment, the script may indirectly result in making the appropriate REST API calls through the use of an additional library of routines or methods. The additional library may be characterized as a wrapper or intervening runtime layer between the script and the code of the REST API. The script may invoke a method or routine of the additional library which, in turn, directly makes the appropriate REST API calls. The additional library may include routines or methods which further simplify the script. A routine or method of the additional library may include code that embodies commonly performed details such as connecting to the system or server including the REST API library of code since the script may be run on a host or other system separate from where the REST API code is located. The routine or method of the additional library may include code that builds and issues the appropriate HTTP request(s). Thus the routine or method of the additional library may simplify the interface exposed to the user and included in the script by embodying such details.

In at least one embodiment, a task hierarchy may be used that models tasks and types of tasks. Task conversion providers may vary in granularity and provide for converting one or more types of tasks. Additionally, task conversion providers may generate a script in one or more target languages. Different task conversion providers may be used to generate scripts in different target languages. Each provider may register in advance of a conversion operation and each provider may declare the task types and one or more target languages that the provider supports for conversion. At runtime when performing processing for converting each task of a job into a script in a target language, the correct matching provider may be identified. A first task being converted may have a corresponding task type and a corresponding target language identifying the target language of the resulting script to be generated. A provider may be determined as matching the first task if the provider has declared it supports converting a task of the corresponding task type to a target language of the corresponding target language of the first task.

In at least one embodiment, the generated scripts may be executed on systems, such as host systems, that are external with respect to the data storage system and with respect to the system or location including the code of the REST API. Thus, use of the techniques herein provides for conversion of a job to a script. The script may then be used to automate data storage system administration tasks and operations. Further the script may be incorporated with other code that performs other operations. Use of a script has further advantages over execution of a job via the GUI in that it allows a user to make any desired modifications to the script programmatically. For example, a script may be used to create many storage groups in an iterative manner in a programming loop construct that iterates over a set of names to be used for storage groups created. The foregoing may be more desirable than manually performing the same operations to create a storage group many times for each desired storage group by using the GUI of the management application. The techniques herein provide for overcoming the disadvantages associated with manual creating a script.

In at least one embodiment, the generated script may be written in a suitable computer language and includes a series of commands within a file. For example the script may be written in Perl or Python and may be executed without requiring compiling and linking. More generally, the generated script may be a code module written in any suitable programming language.

Depending on the language of the code module, the code module may be further processed, such as by compiling and linking, in order to obtain an executable form of the code module and execute the statements and logic embodied in the code module. Thus, although examples in following paragraphs are made with respect to generating and using scripts, more generally, the techniques herein may be applied for use in connection with any suitable code module in any suitable language.

The foregoing and other aspects of the techniques herein are described in more detail in following paragraphs.

Figure 3:
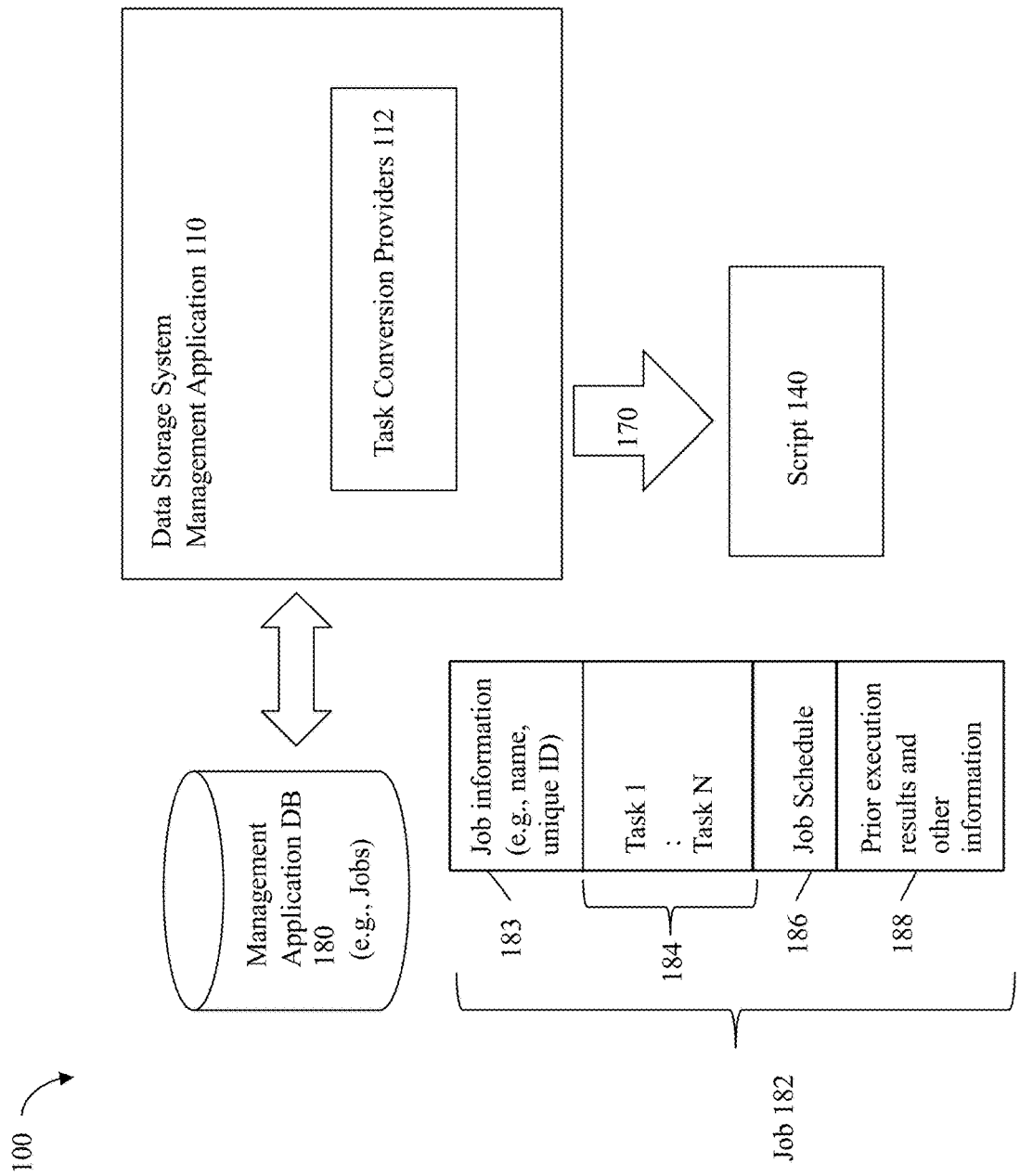
FIGS. 3 and 8 are examples of systems, data and other components that may be used in at least one embodiment in accordance with the techniques herein.

Referring to FIG. 3, shown is an example of systems, data and other components that may be used in at least one embodiment in accordance with the techniques herein. The example 100 includes the data storage management application 110 that may execute, for example, within a browser on a management system. The application 110 may include a GUI used to create a job including one or more tasks as described herein. A description of the job may be stored in the management application database (DB) 180. The element 182 illustrates in more detail information that may be stored in the management application DB 180 for each job created using the application 110. In at least one embodiment, information about each job as denoted by 182 may be encoded in XML (extended markup language) although any suitable language or format may be used.

The job 182 may include various information 183 about the job 182. The job information 183 may include, for example, the name of the job, the unique ID of the job within the application 110 and its DB 180, the current status of the job (e.g., is currently executing, waiting to be executed, completed successful execution at a particular time) as well as other information about the job. The job 182 may include one or more tasks 184 where each such task is described within the DB 180. The information described for each task in 184 may include the parameters or attributes used in performing the particular task. This is illustrated in more detail elsewhere herein. The job 182 as stored in the DB 180 may also include a schedule 186, if any, identifying when the job is scheduled to run. The job 182 may also include prior execution results 188, if any, of the last time the job was executed.

The application 110 may include task conversion providers 112 that provide for converting tasks of the jobs to scripts 140. In at least one embodiment, a provider may convert one or more types of tasks to a particular target language. For example, a target language supported for conversion may include Python and Perl programming languages that may be used in scripts. More generally, any suitable target language may be used. Each provider may register in advance of performing the conversion operation to convert a job to a script. Each provider may declare the task types and one or more target languages that the provider supports for conversion. At runtime when performing processing for converting each task of a job into a script in a target language, the correct matching provider may be identified. A first task being converted may have a corresponding task type and a corresponding target language identifying the target language of the resulting script to be generated. A provider may be determined as matching the first task if the provider has declared it supports converting a task of the corresponding task type to a target language of the corresponding target language of the first task. This is described in more detail elsewhere herein.

The data storage system management application 110, or more generally any application having a user interface (UI) such as a GUI, may have one or more UI controls where the user may make UI selections to perform a data storage management task.

Referring to FIG. 4, shown is an example of a screenshot of a dialog or wizard that may be used in an embodiment in connection with the techniques herein. In the example 200, a user may initiate execution of a wizard or dialog to create a new SG. The example 200 is a screenshot that may be displayed in the GUI to create the new SG. Element 202 denotes the 4 possible steps and associated screenshots that may be performed in sequential order 1-4 in connection with the wizard to provision storage and create the new SG. Element 204 indicates that the current screenshot is associated with the first step 1 in the sequence of 4 steps denoted by 202. A user enters the storage group name SG1 in 206a and may select an existing storage resource pool SRP1 208a, for example, from a drop down list of existing storage resource pools.

A user also selects a service level in 210 from a drop down list of possible defined service levels for the SG being created. In this example, the user selects Diamond 210a. In at least one embodiment, multiple service levels may be defined each specifying different target performance objectives such as with respect to I/Os directed to LUNs in the SG having the associated service level. For example, an embodiment may include the following service levels, from highest service and performance level to lowest service and performance level: Diamond, Platinum, Gold, Silver, and Bronze. An embodiment may include service levels different from those described herein. Each service level may have an associated target response time (RT) range where, for example, Diamond has the highest performance goals and thus the lowest target RT range of all the service levels. In contrast to Diamond, Bronze may have the lowest performance goals and thus the highest target RT range of all the service levels listed.

A user specifies the number of logical devices, LUNs, or volumes in 212 to be included in the SG1. In this example, the user enters 1 in 212a indicating that the SG includes only a single LUN. A user specifies the capacity for the SG and single LUN in 214. In this example, the user specifies 10 GB in 214a. A user indicates in 216 whether compression is enabled or disabled for the SG. In this example, the SG1 has compression enabled. In this example since the user is selecting an existing storage resource pool SRP1 208a, the compression setting 216 of enabled may be set as an existing property of the selected storage resource pool.

A user may also establish a snapshot policy for the SG1 to specify when snapshots for LUNs in the SG1 are to be taken. In this example, as denoted in the area 218, no snapshot policy is in effect for the SG1 so no snapshots are taken of the SG's single LUN. The element 218 also indicates the total capacity for the SG as 10 GB.

At this point in the dialogue or wizard, a user may select one of the UI elements 220, 222 or 224. In this example, the user selects 222 to create a new job and add the job to the job list. Responsive to selecting 222, the wizard or dialog terminates and information is stored in the management application DB 180 for the new job to create the new SG1. Although not illustrated in FIG. 4, a user may also be presented with other options in the GUI to run the newly created job now or schedule the job to run at a later point in time. If scheduled to run at a later point in time, the job information in the DB 180 may be further updated to include the scheduled job execution time, the job status, and possibly other information.

It should be noted that if the user selected element next 224, a second screenshot of the wizard or dialog may be presented to the user corresponding to the second step, hosts 204a in the list 204. Responsive to selecting next 224, the second screenshot as illustrated in the example 250 of FIG. 4B may be displayed in the GUI with element 254 denoting the current second step of the wizard. In the second screenshot, the user performs the second step 204a of the wizard or dialog by making GUI selections to identify the particular hosts and the host or initiator ports allowed to access the newly created SG1. In this example, a user may select an existing host group, HG1 225a, from a drop down list of existing host groups. Subsequent to completing the second step 204a, the user may select the next UI element 256c to trigger proceeding to the third step, ports 204b, in the list 204.

Figure 4A:
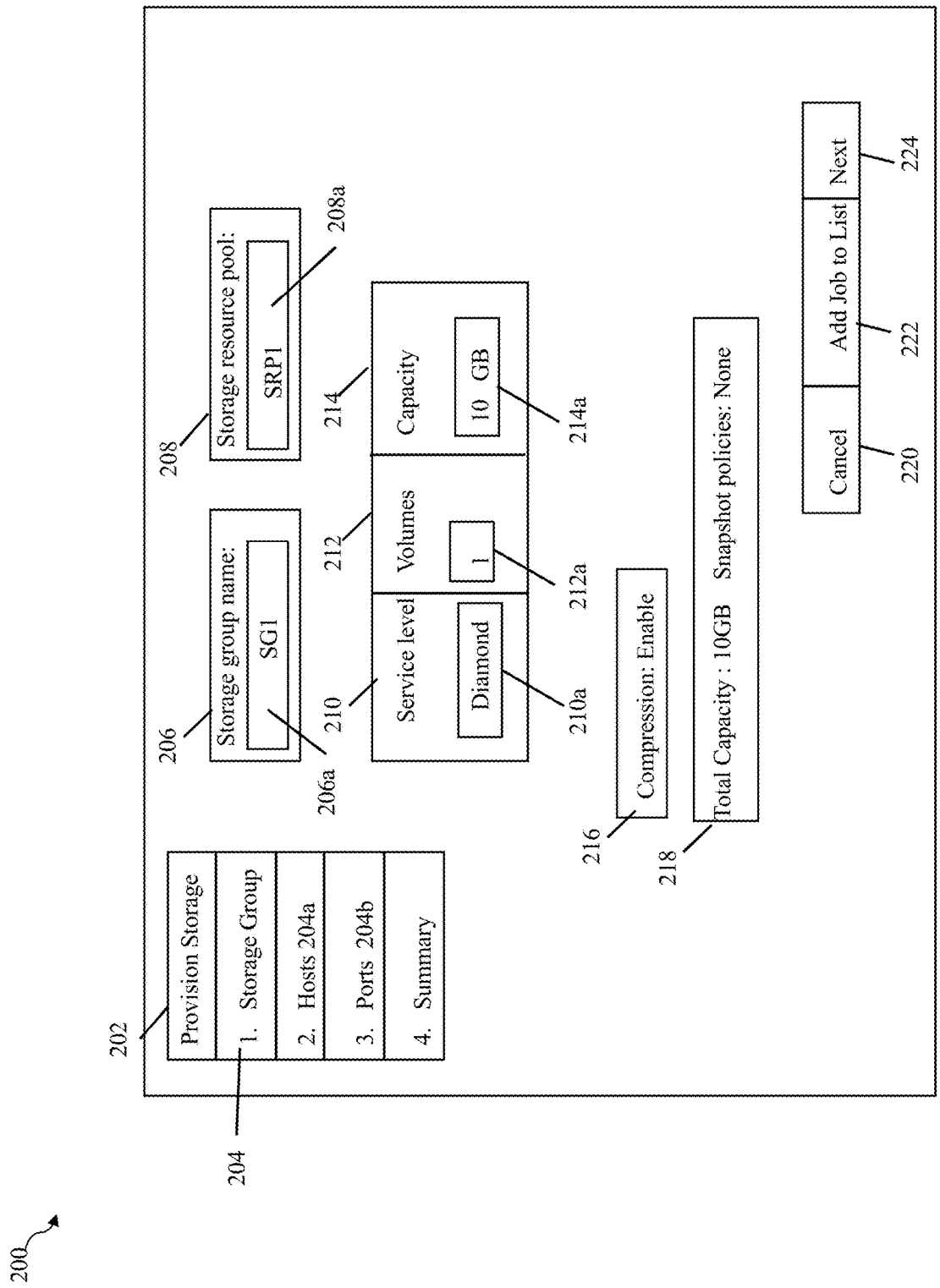
FIGS. 4A, 4B, 4C and 4D are examples of screenshots that may be displayed in a GUI in connection with execution of a wizard or dialog in an embodiment in accordance with the techniques herein.
Figure 4B:
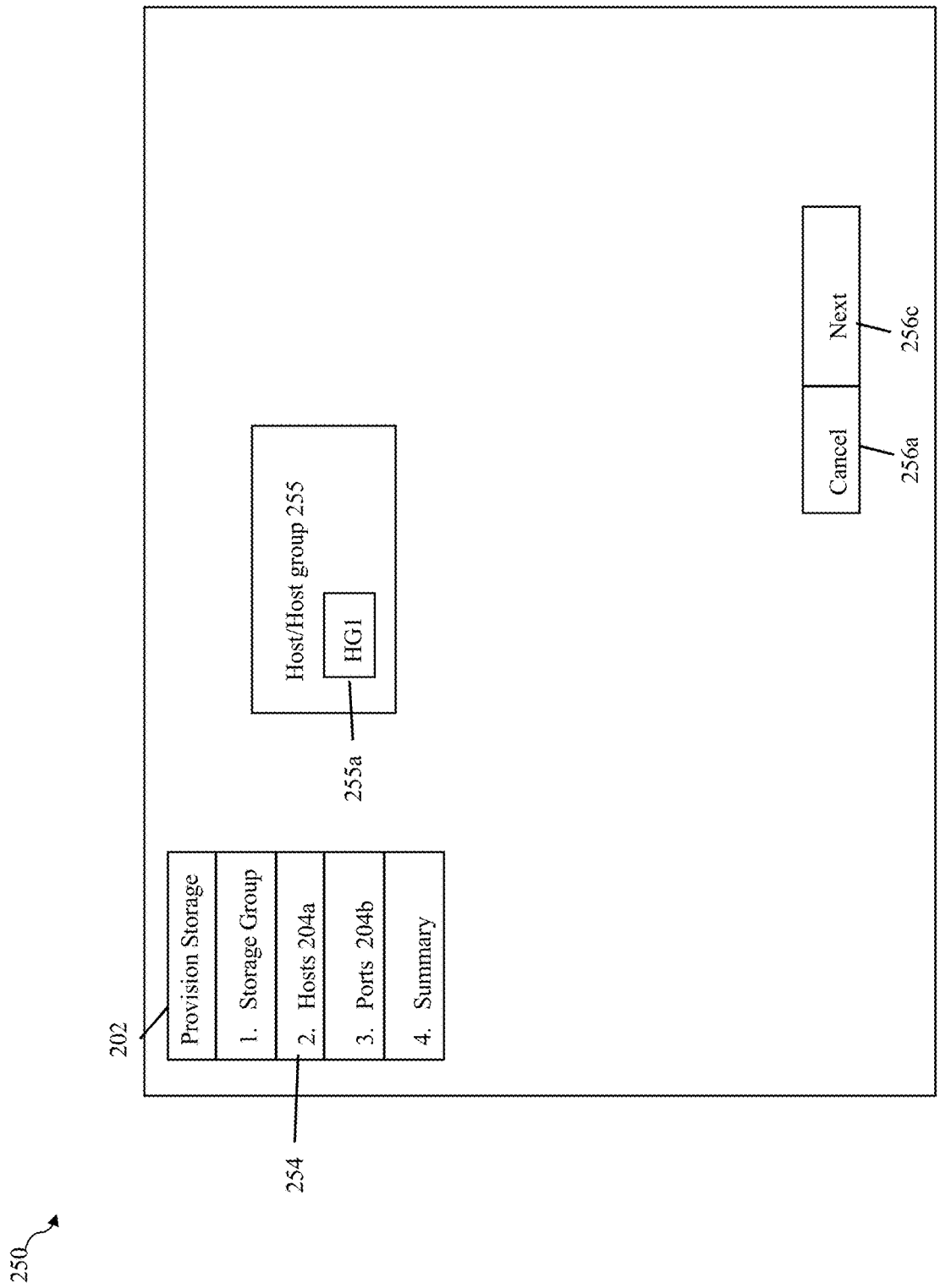
Figure 4C:
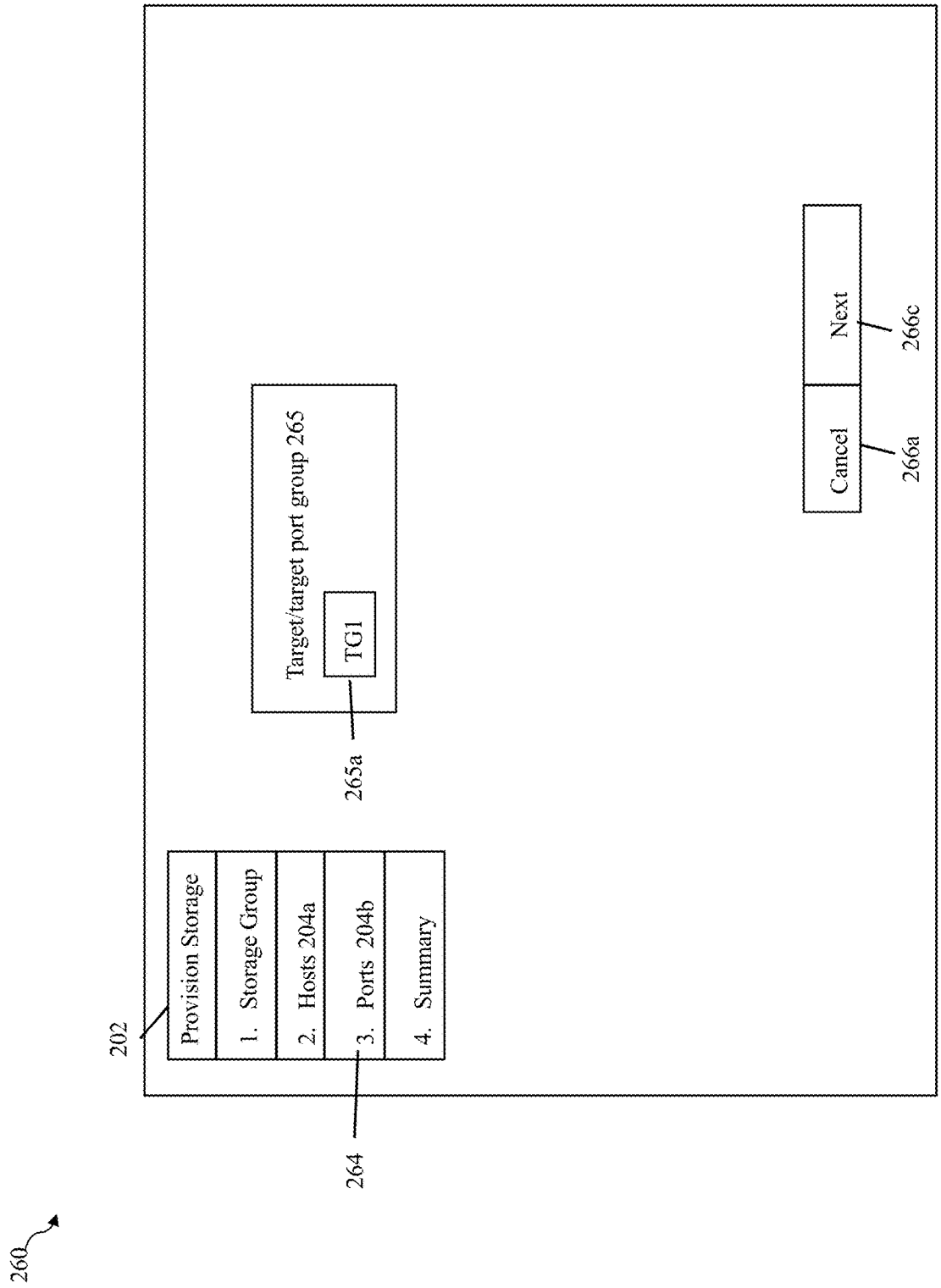

Responsive to selecting next 256c, the third screenshot as illustrated in the example 260 of FIG. 4C may be displayed in the GUI with element 264 denoting the current third step of the wizard. In the third screenshot, the user performs the third step 204b of the wizard or dialog by making GUI selections to identify the particular target ports or a target port group of the data storage system. A target port may be a port of the data storage system over which the one or more LUNs of an SG may be exposed to host initiator ports. Thus, in the step 3 ports 204b, the user is selecting the particular target ports of the data storage system over which the newly created SG1 is exposed to the host/host initiator ports as identified in FIG. 4B. In this example, a user may select an existing target port group, TG1 265a, from a drop down list of existing target port groups. Each of the target port groups may be a logically defined grouping of one or more target ports of the data storage system. Subsequent to completing the third step 204b, the user may select the next UI element 266c to trigger proceeding to the fourth step, summary 204c, in the list 204.

Figure 4D:
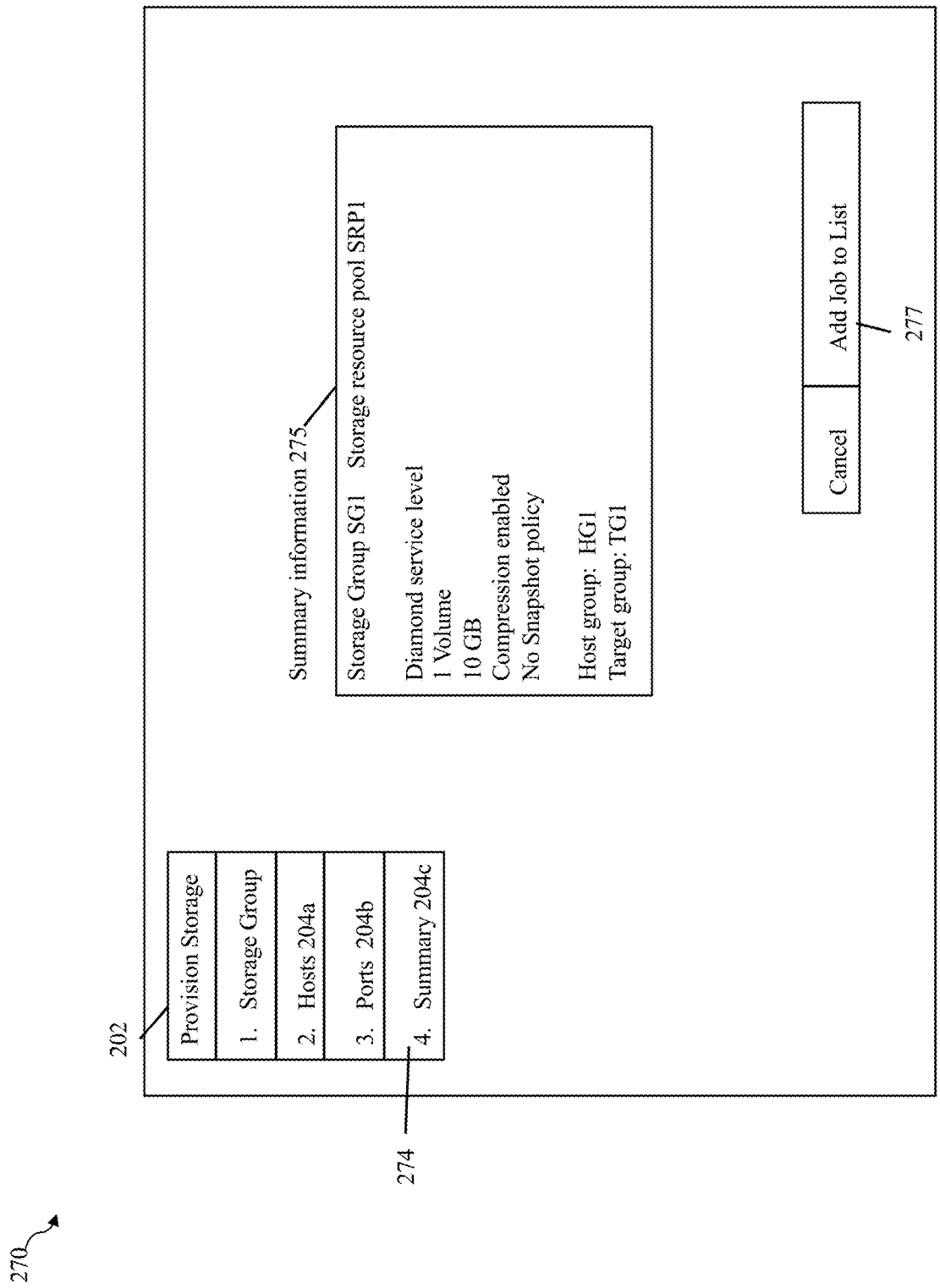

Responsive to selecting next 266c, the fourth screenshot as illustrated in the example 270 of FIG. 4D may be displayed in the GUI with element 274 denoting the current fourth step of the wizard. In the fourth screenshot, the user is presented with a summary of the information 275 for the new SG1 for review. In this example, a user may select 277 to add the job to the list. The processing performed responsive to selecting 277 may be similar to that as described in connection with selecting 222 in FIG. 4A.

It should be noted that an embodiment may include different options on the screenshots of the GUI than as illustrated herein.

Referring back to the FIGS. 4A-4D, the list 202 denotes the 4 steps of the wizard or dialogue. In this example, the steps 1-3 may each correspond to a different task in the same job. Thus, a user selecting element 222 in FIG. 4A to add the job to the list results in adding a job to create the new SG1 with a single task correspond to the step 1. A user proceeding with the wizard through all 4 steps as described above and then selecting 277 to add the job to the list results in adding a job to create the new SG1 with 3 tasks corresponding respectively to the steps 1-3 in the list 202.

For simplification of illustration, following paragraphs provide further detail in connection with a user creating SG1 and selecting 222 to add the job to the list in connection with FIG. 4A whereby the job is added with a single task.

Also, other examples of tasks and jobs relate generally to any data storage system management operation. Other examples of tasks that may be used in connection with the techniques herein, where each task may be included in a different job, include: configuring a RAID group from 3 PDs where the task information identifies the capacity of each PD and the RAID level, such as RAID-1); backup performance records for a specified data from a particular data storage system identified by identifier DS1 where the task information identifies the data storage system identifier DS1 and the specified date; and clear audit logs entries older than 6 months.

In at least one embodiment, tasks can be executed within a job. As noted above, a job may be executed on demand or according to a schedule. In at least one embodiment, jobs and the one or more tasks of each job may be viewed in the GUI. Additionally, the GUI may also allow a user to select a particular job from the list to be executed on demand or at a scheduled time. A user may also select a job from the job list displayed in the GUI for performing other operations, such as editing or modifying the job (e.g., change a user input parameter or value such as the SG name or capacity), deleting the job, and the like. Each job may be associated with a user for security purposes.

Figure 9:
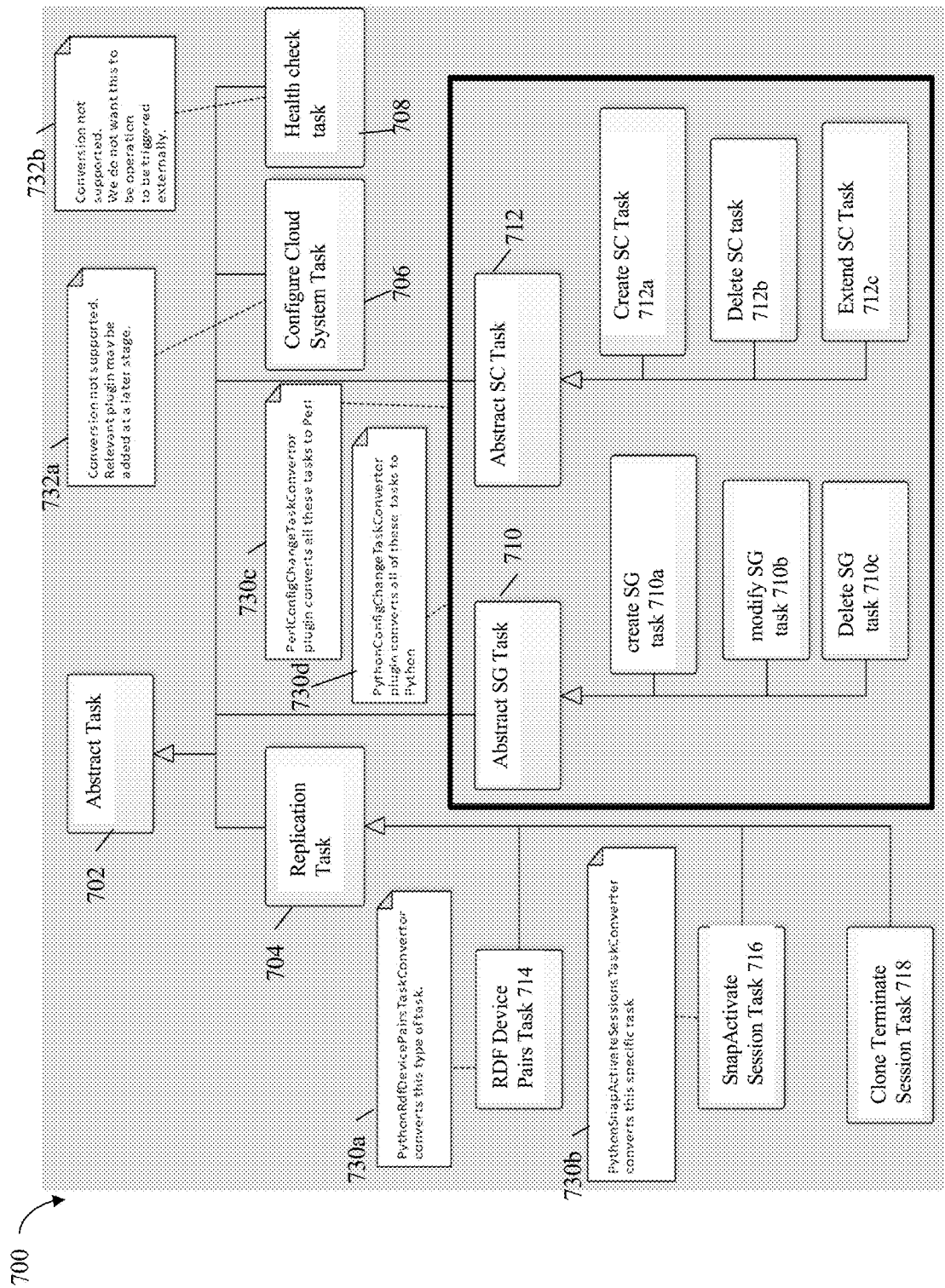
FIG. 9 is an example representation of a task hierarchy and providers in an embodiment in accordance with the techniques herein.

In at least one embodiment, the representation of the various tasks may be modeled using Java classes having a hierarchical structure, for example, as in FIG. 9 described elsewhere herein. A particular task instance may be encoded using XML that is persistently stored in the management application DB 180 of FIG. 3.

Referring to FIG. 5, shown is an example of an XML representation that captures the operation to create the storage group SG1 responsive to selecting element 222 to add the job to create SG1 to the list. In this example, the class associated with the task to create the storage group SG1 is Create Storage Group task. The example 300 includes a portion of the XML representation of the task to create SG1. In particular the example 300 includes the portion of the XML associated with the user specified the storage group parameters or attributes in the XML representation of the job as stored in the management application DB 180.

The element 302 denotes the XML that specifies the parameter or attribute that compression is enabled. The element 304 denotes the XML that specifies the parameter or attribute of the storage group's unique identifier. The element 306 denotes the XML that specifies the parameter or attribute of the service level of Diamond. The element 308 denotes the XML that specifies the parameter or attribute of the storage resource pool from which storage is provisioned for SG1. The element 310 denotes the XML that specifies the parameter or attribute of the user specified name, SG1, for the new storage group created. The element 312 denotes the XML that specifies the parameter or attribute of the data storage system identifier identifying the data storage system in which the new SG1 is created. The element 314 denotes the XML that specifies the parameter or attribute of the number of volumes or LUNs, which is 1, in SG1. The element 316 denotes the XML that specifies the parameter or attribute of the number of the volume size which is 10 GB in SG1.

It should be noted that in at least one embodiment, different options specified as user inputs may be abstracted and specified in connection with a particular storage resource pool option or service level setting. For example, the enable compression option may be a setting associated with the storage resource pool and may be specified as a property of the selected storage resource pool, SRP1.

Referring to FIG. 6, shown is an example of a script that may be created for the job including the single task that creates SG1. The script in the example 400 may be generated for the single task that creates SG1 having the attributes or parameter values specified as in FIG. 5. Additionally, in this example, the target language of the script is Python.

In at least one embodiment, the script may include calls into a scripting library written for the particular target language, such as Python. In turn, each call to a method or routine in the scripting library may include one or more calls to the REST API. As a variation, an embodiment may directly have the task conversion providers generate a script that includes the one or more REST API calls. For purposes of illustration, the script in the example 400 of FIG. 6 includes calls to the scripting library to indirectly invoke the REST API.

The providers may output scripts having a format as in FIG. 6 with library definitions 407, task parameters or attributes 410, and remaining code 420, 430 used in connection with the call into the scripting library. In the example 400, the generated script may include code 408 that imports definitions from one or more libraries, such as the scripting library. In this example 400, the scripting library is named PyU4V.

The element 410 includes code that specifies user defined attributes or parameters for the newly created storage group SG1. The parameters in 410 are those user specified parameters used in the subsequent scripting library call in the section 430 described below. Element 410*a* corresponds to the storage group name SG1 as described in connection with element 310 of FIG. 5. Element 410*b* corresponds to the storage resource pool name SRP1 as described in connection with element 308 of FIG. 5. Element 410*c* corresponds to the Diamond service level as described in connection with element 306 of FIG. 5. Element 410*d* corresponds to the number of volumes, 1, in SG as described with the element 314 of FIG. 5. Element 410*e* corresponds to the capacity or size of the storage group name SG1 as described with the element 316 of FIG. 5.

The element 420 includes code that provides the parameters used in the scripting library call in a dictionary object with pre-defined keys. The element 430 includes the invocation of the method or routine of the scripting library, PyUV4 in this example, to create the storage group SG1. The method of the scripting library called in the code snippet 430 is conn.provisioning.create_non_empty_storage-group( ) used to create storage groups, where parameters are provided in the specific dictionary object with pre-defined keys from 420.

In the particular script illustrated in FIG. 6, the user may use the script as a template in connection with creating additional storage groups by modifying one or more of the desired parameters of the code section 410. The parameters in the script of FIG. 6 may also be included a particular portion of the script annotated, for example, by the comments as in 410. In this manner, the user may utilize the methods of the scripting library and simply modify the desired parameters in the code section 410 where such parameters are used in the code of 420 and 430. Using a scripting library such as PyU4V makes scripting easier by providing utility methods to prepare commonly used requests. In such an embodiment, the user modifying the parameters in the section 410 and possibly other portions of the generated script may still need to have knowledge about the particular methods or routines of the scripting library. In at least one embodiment, a scripting library such as PyU4V may be used for convenience and to simplify the generated scripts. In this example with reference to the element 430, the scripting library method conn.provisioning.create_non_empty_storagegroup( ) invokes the REST API, for example, to establish or create a connection to the REST API code (e.g., included in the management application or management system) and send the particular request(s) to perform the desired management operation (e.g., create the storage group SG1). Establishing or creating a connection to the REST API code may include, for example, authenticating to the data storage system management application 110 using proper credentials. As an alternative, if no scripting library is used, the script may directly include calls to the REST API rather than having the scripting library method conn.provisioning.create_non_empty_storagegroup( ) call the REST API.

Figure 7:
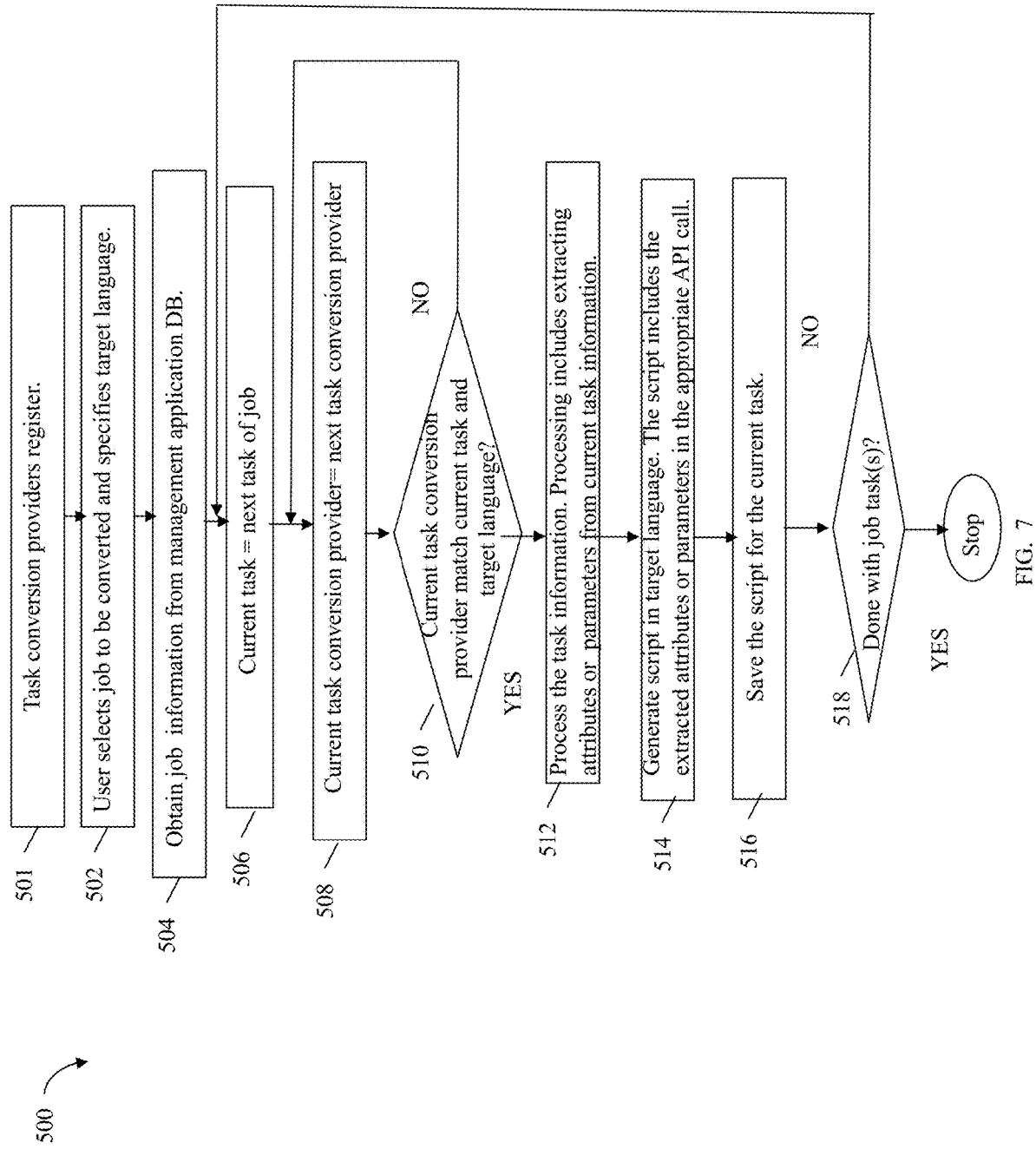
FIG. 7 is a flowchart of processing that may be performed to convert one or more tasks of a job to a script in an embodiment in accordance with the techniques herein.

Referring to FIG. 7, shown is a flowchart of processing steps that may be performed in an embodiment in accordance with the techniques herein. The flowchart 500 summarizes steps described above that may be performed to generate a script for a job including one or more tasks.

At the step 501, the providers register. Each provider registers and declares the types of tasks and the target scripting language supported. From the step 501, control proceeds to the step 502. At the step 502, a user selects a job to be converted and specifies a target scripting language. From the step 502, control proceeds to the step 504. At the step 504, processing is performed to obtain the job information from the management application DB. From the step 504, control proceeds to the step 506 where the current task is assigned the next task in the job. It is assumed that each job includes at least one task.

From the step 506, control proceeds to the step 508 where processing is commenced to traverse the list of registered providers and find a matching provider for the desired conversion of the current task to the specified target language. It is assumed that each task will match one of the providers. At the step 508, the current task conversion provider is assigned the next task conversion provider. From the step 508, control proceeds to the step 510 where a determination is made as to whether the current task conversion provider matches the current task and target scripting language. If step 510 evaluates to no, control proceeds to the step 508. Otherwise if the step 510 evaluates to yes, the current task conversion provider is capable of performing the desired conversion of the current task type to the specified target scripting language. If the step 510 evaluates to yes, control proceeds to the step 512.

At the step 512, the current task conversion provider processes the task information for the current task. The task information is a portion of the job information from the management application DB describing the current task. The processing performed in the step 512 includes extracting the attributes or parameters of the task from the task information and entering the extracted attributes into the script. The processing may include, for example, adding the comments to denote the user specified parameters that may be modified in connection with using the scripting library method invoked in further lines of code of the script. From the step 512, control proceeds to the step 514 to generate a script in the target language for the current task. The script generated includes the extracted parameters or attributes in the appropriate scripting library API call(s). From the step 514, control proceeds to the step 516 where the script for the current task may be saved or stored persistently. For example, the script may be saved to the DB 180 or another location, such as on a host, where the script will be subsequently executed or further modified. From the step 516, control proceeds to the step 518. At the step 518 a determination is made as to whether all tasks of the current job have been processed. If the step 518 evaluates to yes processing stops. Otherwise, if the step 518 evaluates to no, control proceeds to the step 506.

In at least one embodiment, a single script may be generated for the job. If the job incudes multiple tasks, the script may include information for multiple tasks and thus multiple sets of information such as illustrated by 410, 420 and 430 of FIG. 6 for each task. As a variation, an embodiment may generate a different script file for each task.

Figure 8:
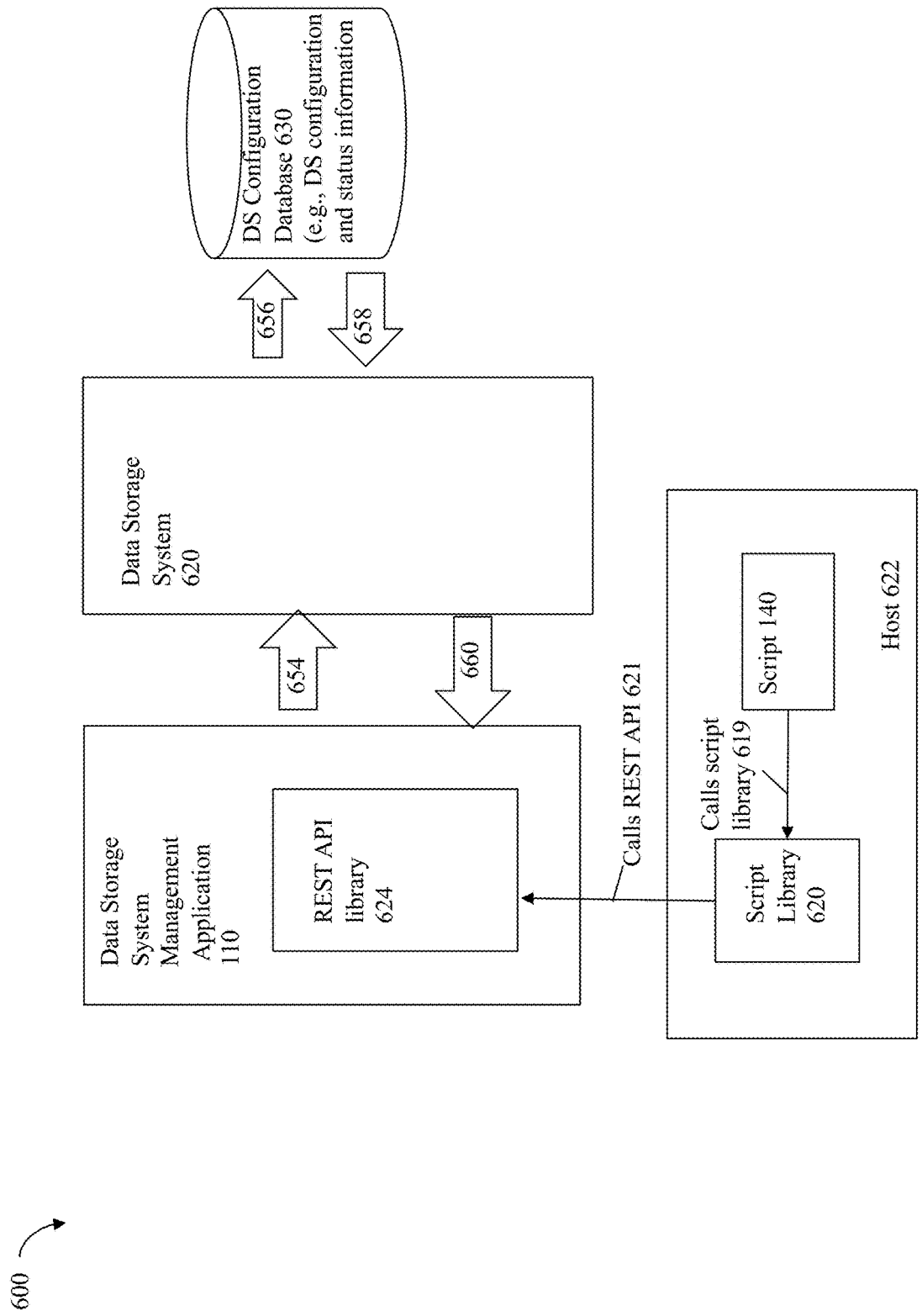

Referring to FIG. 8, shown is an example of systems and components that may be used in an embodiment in accordance with the techniques herein in connection with running or executing a script. The script may be created as described above to perform a data storage system management operation, such as create the new storage group, SG1. In the example 600, the script 140 is stored on the host 622 and includes calls 619 into the scripting library 620, such as the call to the scripting library method conn.provisioning.create_non_empty_storagegroup( ). The code of the scripting library method, such as conn.provisioning.create_non_empty_storagegroup( ), further includes calls 621 to the REST API library 624. In connection with creating the new storage group SG1, code of an invoked REST API of 624 may issue one or more requests (654) to the data storage system 620 to update or modify the data storage system (DS) configuration database 630 describing the current configuration of the data storage system. Subsequently, the data storage system 620 may issue one or more requests 656, such as database queries, to the database 630 to perform the necessary updates to the configuration data in the database 630.

In at least one embodiment, the database 630 may be stored on the data storage system 620. As a variation, the database 630 may be located on a different system, such as at a different location accessible via a network connecting the data storage system 620 and the database 630. A response may be returned 658 from the database 630 to the data storage system 620, and then further returned 660 to the data storage system management application 110. Generally, the REST API requests sent 654 may be requests to perform any desired operation, such as read, modify or update, with respect to the data storage system configuration information in the database 630. If any information is read from the database 630, such information may be returned as part of the responses transmitted (658, 660).

In at least one embodiment in accordance with the techniques herein, the data storage system management application 110 may execute in the context of a browser.

The DS configuration database 630 may generally include information about the data storage system 620. For example, in at least one embodiment, the database 130 may include data storage system configuration, performance, and status information. For example, the database 630 may include data storage system configuration information regarding the various physical and logical storage objects or entities in the data storage system (e.g., configured SGs, provisioned LUNs, configured RAID groups). The database 630 may, for example, identify what LUNs are included in an SG, what hosts and initiator ports of hosts have access to particular SGs, what LUNs or SGs are exposed over which particular data storage system target ports of HAs or FAs, what one or more RAID groups the LUNs have storage provisioned from, what physical storage devices are included in each RAID group configuration, the particular RAID level of a RAID group, and what is the capacity of a LUN, what is the amount of used and free storage of SGs, LUNs, and RAID groups.

Referring to FIG. 9, shown is an example illustrating a task hierarchy of the different types of tasks that may be used in an embodiment in accordance with the techniques herein. The example 700 is a diagram showing a simplified model of the various task classes or categories that may be included an embodiment. The hierarchy additionally illustrates various providers that may be responsible for performing conversion of one or more particular types of tasks.

The abstract task class or category 702 includes the following classes or categories: replication task 704, abstract SG (storage group) task 710, abstract SC (storage container) class 712, configure cloud system task 706 and health check task 708. The replication task class or category 704 includes: RDF Device pairs task 714, snap activate session task 716, and clone terminate session task 718. The abstract SG task category or class 710 includes: create SG task 710a, modify SG task 710b, delete SG task 710c, and create SG task 710d. The abstract SC task category or class 712 includes: create SC task 710a, delete SC task 712b and extend SC task 712c.

All child items (e.g., 714, 716 and 718) within the parent replication task class or category 704 may be a further refined classification or categorization of the parent category 704. For example, element 714 denotes a task of establishing an R1-R2 RDF device pair as described herein for use in connection with remote replication using the SRDF remote data replication facility described herein. Element 716 denotes a task of activating a session to take a new snapshot of a LUN. Element 718 denotes a task of terminating a clone session. A clone may be another type of local replication technology, for example, that may make a physical copy of a LUN within the same data storage system.

All child items (e.g., 710a-c) of the parent abstract SG class 710 may be a further refined classification or categorization of parent 710. Elements 710a-c may denote particular SG or storage group tasks. Element 710a is a task to create a new SG. Element 710b is a task to modify an existing SG. Element 710c is a task to delete an existing SG.

All child items (e.g., 712a-c) of the parent abstract SC class 712 may be a further refined classification or categorization of parent 712 as related to storage containers described elsewhere herein. Consistent with other discussion herein, a storage container (SC) may be a configured storage resource including storage capacity available for provisioning VVOLs or virtual volumes used by VMs. Elements 712a-c may denote particular SC tasks. Element 712a is a task to create a new SC. Element 712b is a task to delete an existing SC. Element 712c is a task to extend or provision more storage for an existing SC.

The example 700 also illustrates the particular task conversions performed by particular providers in at least one embodiment. For example, element 730a indicates that the provider Python RDFDevicePairs Task converter converts the task 714 to the target scripting language Python. Element 730b indicates that the provider Python SnapActivateSessions Task converter converts the task 716 to the target scripting language Python. In a similar manner, although not illustrated, another provider may convert the task 718 to the target scripting language Python. The providers 730a and 730b are examples of fine grain providers with each provider converting only one type of task. In contrast to 730a-b, a provider may also be a coarse grain provider responsible for converting more than one type of task. For example, element 730c denotes a provider Perl ConfigChange Task Converter converting all of the tasks 710, 710a-c, 712, 712a-c to the target scripting language Perl. Element 730d denotes a provider Python ConfigChange Task Converter converting all of the tasks 710, 710a-c, 712, 712a-c to the target scripting language Python.

In a similar manner, an embodiment in accordance with the techniques may add or remove providers with any desired level of granularity for converting one or more task types as denoted by the different elements in the hierarchy of the example 700.

In connection with generating the script in the example of FIG. 6, the provider 730d may perform the conversion of the job to create storage group SG1 having the single task as discussed above.

Element 732a indicates that conversion is not currently supported for the task 706 and such a fine grain converter for the single task type 706 may be added at a later date. Element 732b indicates that conversion is also not currently supported for the task 708 that performs a health check on the data storage system and its components. The health check may, for example, perform an assessment and provide information regarding the health of components in the data storage system such as whether any LUNs are unavailable, whether any PDs have experienced errors, and the like. In this example, no converter may be provided to the task type 708 because it may not be desirable to allow the particular task to be performed remotely. In such an embodiment, the particular task 708 may be performed using the management application such as using the GUI.

In at least one embodiment, Task Conversion Providers may be specific to a given scripting language. For example, an embodiment may have separate convertors for generating Python scripts and Perl scripts. In at least one embodiment, each of the providers declares the tasks or task type and languages it supports via the canConvert( ) method having a defined interface as following:

boolean canConvert(AbstractTask task, String scriptingLanguage)

This method canConvert may return true if the provider supports the given task and language. For example the provider that supports the conversion of a RDFDevicePairsTask to Python will have the following canConvert method:

public boolean canConvert(AbstractTask task, String scriptingLanguage)
{return task instanceof RDFDevicePairsTask &&
   scriptingLanguage.equals(Languages.PYTHON)
}

Each "TaskConversionProvider" may be registered in advance of the conversion operation. When a task is being converted to a script, a central service, such as a task service, queries each provider on its ability to convert the task. When it finds the correct provider, the task service passes the task to the provider for conversion via the convert( ) method:

provider.convertTaskToScript(myReplicationTask, Languages.PYTHON)

The above method, provider.convertTaskToScript, extracts the user inputs from the task and returns a script that achieves the same result as the task with the same inputs. In at least one embodiment, the generated script may include the user inputs in a particular sections, such as 410, where the parameters or attributes corresponding to the specified user inputs may be highlighted, so that the user can easily identify and modify as desired.

The hierarchy of FIG. 9 is one example of a hierarchy of tasks where related or similar tasks may be grouped together in the same category or class. Such a categorization and hierarchical structure of multiple levels facilitates management of the tasks and conversion of the tasks into scripts. In such an embodiment, as additional tasks are added, they may be incorporated into the hierarchy and may have new or additional task conversion providers added to support conversion of the additional tasks. The classification of the tasks allows for flexible control regarding the scope and scale of each provider. For example, an embodiment may choose to have an implementation with many small providers each having limited conversion responsibility (e.g., like provider 730a), or an embodiment may choose to have a lesser number of larger providers with more conversion responsibility (e.g., like provider 730c, 730d).

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing management operations comprising:
   creating a job using a graphical user interface (GUI) of an application, wherein the job includes at least a first task that performs a first data storage management operation, wherein the first task is a first task type of a plurality of task types denoting a plurality of data storage management operations;
   responsive to said creating, storing first information that describes the job in a management application database for the application, wherein said first information includes task information describing each task of the job, wherein said first information includes first task information describing the first task, and wherein the first task information includes first parameter information describing one or more parameters used in connection with performing the first data storage management operation; and
   performing first processing that generates one or more code modules in a target language for the job, wherein said first processing uses the first information from the management application database, wherein said first processing includes converting the first task into a first code module written in the target language further comprising:
      determining, at runtime during said first processing that generates the one or more code modules, a first of a plurality of providers that converts tasks of the first task type to code modules of the target language;
      processing the first task information describing the first task, said processing including extracting the first parameter information from the first task information; and
      generating, by the first provider and in accordance with said processing of the first task information, the first code module in the target language for the first task, wherein the first code module includes the first parameter information extracted by said processing of the first task information.

2. The method of claim 1, wherein a plurality of providers convert a plurality of types of tasks to code modules.

3. The method of claim 2, wherein said creating the job includes executing a wizard or dialogue to perform the data storage management operation.

4. The method of claim 3, wherein the target language is a target scripting language and wherein the first code module is a script written in the target scripting language.

5. The method of claim 4, further comprising registering the plurality of providers prior to performing the first processing.

6. The method of claim 5, wherein said registering the plurality of providers includes each of the plurality of providers declaring one or more of the plurality of task types of tasks that said each provider converts to a specified one of a plurality of target scripting languages.

7. The method of claim 4, wherein the management application is a data storage system management application and the data storage management operation modifies data storage configuration information describing a configuration of a data storage system.

8. The method of claim 7, further comprising:
   executing the script on a host to perform the first data storage system management operation, wherein the script includes a first call to a scripting library of the host, and wherein the scripting library is written in the target scripting language.

9. The method of claim 8, wherein the first call transfers control to first code of the scripting library included on the host, and wherein the first code of the scripting library includes a second call to a second library included in the management application.

10. The method of claim 9, wherein the second call to the second library included in the management application is made over a control path and the management application issues at least one request to the data storage system to modify the data storage configuration information describing the configuration of the data storage system.

11. The method of claim 4, wherein a hierarchy includes the plurality of task types organized into a plurality of levels.

12. The method of claim 11, wherein the hierarchy includes a plurality of categories, wherein each of the plurality of categories including two or more of the plurality of task types of tasks that are related.

13. A system comprising:
   one or more processors; and
   a memory comprising code stored thereon that, when executed, performs a method of performing management operations comprising:
      creating a job using a graphical user interface (GUI) of an application, wherein the job includes at least a first task that performs a first data storage management operation, wherein the first task is a first task type of a plurality of task types denoting a plurality of data storage management operations;
      responsive to said creating, storing first information that describes the job in a management application database for the application, wherein said first information includes task information describing each task of the job, wherein said first information includes first task information describing the first task, and wherein the first task information includes first parameter information describing one or more parameters used in connection with performing the first data storage management operation; and
      performing first processing that generates one or more code modules in a target language for the job, wherein said first processing uses the first information from the management application database, wherein said first processing includes converting the first task into a first code module written in the target language further comprising:
   determining, at runtime during said first processing that generates the one or more code modules, a first of a plurality of providers that converts tasks of the first task type to code modules of the target language;
   processing the first task information describing the first task, said processing including extracting the first parameter information from the first task information; and
   generating, by the first provider and in accordance with said processing of the first task information, the first code module in the target language for the first task, wherein the first code module includes the first parameter information extracted by said processing of the first task information.

14. A non-transitory computer readable medium comprising code stored thereon that, when executed, performs a method of performing management operations comprising:
   creating a job using a graphical user interface (GUI) of an application, wherein the job includes at least a first task that performs a first data storage management operation, wherein the first task is a first task type of a plurality of task types denoting a plurality of data storage management operations;
   responsive to said creating, storing first information that describes the job in a management application database for the application, wherein said first information includes task information describing each task of the job, wherein said first information includes first task information describing the first task, and wherein the first task information includes first parameter information describing one or more parameters used in connection with performing the first data storage management operation; and
   performing first processing that generates one or more code modules in a target language for the job, wherein said first processing uses the first information from the management application database, wherein said first processing includes converting the first task into a first code module written in the target language further comprising:
   determining, at runtime during said first processing that generates the one or more code modules, a first of a plurality of providers that converts tasks of the first task type to code modules of the target language;
   processing the first task information describing the first task, said processing including extracting the first parameter information from the first task information; and
   generating, by the first provider and in accordance with said processing of the first task information, the first code module in the target language for the first task, wherein the first code module includes the first parameter information extracted by said processing of the first task information.

15. The non-transitory computer readable medium of claim 14, wherein a plurality of providers convert a plurality of types of tasks to code modules.

16. The non-transitory computer readable medium of claim 15, wherein said creating the job includes executing a wizard or dialogue to perform the data storage management operation.

17. The non-transitory computer readable medium of claim 16, wherein the target language is a target scripting language and wherein the first code module is a script written in the target scripting language.

18. The non-transitory computer readable medium of claim 17, wherein the method further comprises registering the plurality of providers prior to performing the first processing, and wherein said registering the plurality of providers includes each of the plurality of providers declaring one or more of the plurality of task types of tasks that said each provider converts to a specified one of a plurality of target scripting languages.

* * * * *